United States Patent [19]

Diaz

[11] 4,388,293
[45] Jun. 14, 1983

[54] H₂S REMOVAL

[75] Inventor: Zaida Diaz, Houston, Tex.

[73] Assignee: Shell Oil Company, Houston, Tex.

[21] Appl. No.: 324,357

[22] Filed: Nov. 24, 1981

[51] Int. Cl.³ .................. C01B 17/04; B01D 53/34
[52] U.S. Cl. ............................ 423/573 R; 423/226
[58] Field of Search .................. 423/226, 571, 573 R

[56] References Cited

U.S. PATENT DOCUMENTS

| | | | |
|---|---|---|---|
| 4,009,251 | 2/1977 | Meuly | 423/573 |
| 4,076,621 | 2/1978 | Hardison | 423/573 X |
| 4,189,462 | 2/1980 | Thompson | 423/573 |

OTHER PUBLICATIONS

*Lange's Handbook of Chem.*, 12 ed., McGraw-Hill, 1979, pp. 5-37 and 5-40.

*Primary Examiner*—Earl C. Thomas
*Attorney, Agent, or Firm*—Albert J. Adamcik

[57]  ABSTRACT

A cyclic process for the removal of hydrogen sulfide, and carbon dioxide, from a variety of gas streams is disclosed. The gas stream containing the sour gas(es) is contacted with an aqueous solution of a specific reactant ligand or chelate, or mixtures thereof, optionally in an absorbent, containing specific stabilizers for improvement of chelate life. The hydrogen sulfide is converted to sulfur, $CO_2$ may be absorbed to produce a purified gas stream, and the reactant chelate is reduced. The process includes sulfur removal and regeneration of the reactant chelate.

20 Claims, No Drawings

H₂S REMOVAL

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by the use of a suitable selective absorbent.

Because these "cleanup" processes generally represent significant costs to manufacturing operations, any improvements in such processes which increase their efficiency may have great economic importance. For example, where ligands or chelates of polyvalent metals are employed, degradation or decomposition of the polyvalent metal chelates represents an important cost in the process, as well as requiring measures for decomposition product bleed or removal and addition of fresh solution. Even in the case of preferred chelates such as those of N-(2-hydroxyethyl)ethylene diamine triacetic acid and nitrilotriacetic acid, ligand decomposition, over a period of time, requires attention to prevent build-up of decomposition products and consequent loss of efficiency. The invention addresses this problem.

SUMMARY OF THE INVENTION

Accordingly, the invention comprises, in one embodiment, a process for the removal of $H_2S$ from a sour gaseous stream comprising contacting the sour gaseous stream in a contacting zone with an aqueous reactant mixture at a temperature below the melting point of sulfur, the aqueous reactant mixture comprising an effective amount of an oxidizing reactant which is an oxidizing polyvalent metal chelate compound or a mixture of oxidizing polyvalent metal chelate compounds, and a stabilizing amount of a composition selected from the group consisting of thiodiglycolic acid, 3,3-thiodipropionic acid, and mixtures thereof. A sweet gas stream is produced, and an aqueous admixture containing sulfur and a reduced reactant is removed from the contact zone. At least a portion of the sulfur crystals may be removed before regenerating the reactant, or at least a portion of the sulfur crystals may be removed after regeneration. Alternately, the sulfur may be recovered, as described in copending application Ser. No. 267,182 entitled Froth Process, by G. Blytas and Z. Diaz, filed May 26, 1981, which disclosure is incorporated herein by reference. The reduced polyvalent metal chelate, etc. are regenerated, preferably by contacting the mixture in a regeneration zone or zones with oxygen. As used herein, the term oxygen includes oxygen-containing gases, such as air or air-enriched with oxygen. The oxygen oxidizes the reduced metal ions of the chelate or chelates to a higher valence state, and the regenerated mixture is returned to the contact zone. The stabilizers employed herein are supplied to reduce the rate of ligand or chelate degradation.

In another embodiment of the invention, a sour gaseous stream containing $H_2S$ and $CO_2$ are contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), an effective amount of an oxidizing polyvalent metal chelate compound, and mixtures thereof, and a stabilizing amount of the stabilizer(s) described. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal chelate, etc. In the process, the reactant is reduced, and the sulfur may be treated, as described, supra. The sulfur crystals may be removed prior or subsequent to regeneration of the admixture.

The invention also provides, in this embodiment, for the regeneration of the reactant and the absorbent. Preferably, the loaded absorbent mixture and the reduced polyvalent metal chelate, or mixtures thereof, are regenerated by contacting the mixture in a regeneration zone or zones with oxygen. The oxygen is preferably supplied as air, or air-enriched with oxygen. If significant quantities of $CO_2$ have been absorbed, the reactant-containing solution is preferably treated, such as by heating or pressure reduction, to remove the bulk of the $CO_2$ before regeneration of the reactant (either prior or subsequent to sulfur removal). Alternately, or if small quantities of $CO_2$ are absorbed, the $CO_2$ may simply be stripped in the regeneration zone.

As indicated, the regeneration of the reactant is preferably accomplished by the utilization of oxygen, preferably as air. The oxygen will accomplish two functions, the oxidation of the reactant to its higher valence state, and the stripping of any residual $CO_2$ (if originally present) from the absorbent mixture. The oxygen (in whatever form supplied) is supplied in a stoichiometric equivalent or excess with respect to the amount of metal ion of the chelate or chelates present in the mixture. Preferably, the oxygen is supplied in an amount from about 1.2 to 3 times excess.

The particular type of gaseous stream treated is not critical, as will be evident to those skilled in the art. Streams particularly suited to removal of $H_2S$ and $CO_2$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, but may range from about 0.1 percent to about 99 percent or greater by volume. Obviously, the amounts of $H_2S$ and $CO_2$ present are not generally a limiting factor in the practice of the invention.

The temperatures employed in the contacting or absorption-contact zone are not generally critical, except that the reaction is carried out below the melting point of sulfur, and, if an absorbent is used, the temperatures employed must permit acceptable absorption of $CO_2$. In many commercial applications, such as the removal of $H_2S$ and $CO_2$ from natural gas to meet pipeline specifications, absorption at ambient temperatures is desired, since the cost of refrigeration would exceed the benefits obtained due to increased absorption at the lower temperature. In general, temperatures from 10° C. to 80° C. are suitable, and temperatures from 20° C. to 45° C. are preferred. Contact times will range from about 1 second to about 270 seconds or longer, with contact times of 2 seconds to 120 seconds being preferred.

Similarly, in the regeneration or stripping zone or zones, temperatures may be varied widely. Preferably, the regeneration zone should be maintained at substantially the same temperature as the contacting zone. If heat is added to assist regeneration, cooling of the aqueous admixture is required before return of the admixture to the contacting zone. In general, temperatures of from about 10° C. to 80° C., preferably 20° C. to 45° C., may be employed.

Pressure conditions in the contacting zone may vary widely, depending on the pressure of the gas to be treated. For example, pressures in the contacting zone may vary from one atmosphere up to one hundred fifty or even two hundred atmospheres. Pressures of from one atmosphere to about one hundred atmospheres are preferred. In the regeneration or desorption zone or zones, pressures also may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, incorporated herein by reference. Preferably, if the iron chelate of nitrilotriacetic acid is used, pH in the process of the invention will range from about 6 to about 7.5. The process is preferably conducted continuously.

As indicated, the $H_2S$, when contacted, is rapidly converted in the process of the invention by the oxidizing polyvalent metal chelate, or mixtures thereof, to elemental sulfur. Since many polyvalent metal chelates have limited solubility in many solvents or absorbents, if an absorbent is used, the polyvalent metal chelates are preferably supplied in admixture with the liquid absorbent and water. The amount of oxidizing polyvalent metal chelate, or mixtures thereof, supplied is an effective amount, i.e., an amount sufficient to convert all or substantially all of the $H_2S$ in the gas stream, and will generally be on the order of at least about one mol per mol of $H_2S$. Ratios of from about 1 or 2 mols to about 15 mols of polyvalent metal chelate per mol of $H_2S$ may be used, with ratios of from about 2 mols per mol to about 5 mols of polyvalent metal chelate per mol of $H_2S$ being preferred. The manner of preparing the admixture containing an absorbent is a matter of choice. For example, the polyvalent metal chelate may be added to the absorbent, and, if necessary, then water added. The amount of water added will normally be just that amount necessary to achieve solution of the polyvalent metal chelate, and can be determined by routine experimentation. Since the polyvalent metal chelate may have a significant solubility in the solvent, and since water is produced by the reaction of the $H_2S$ and the ions of the chelate, precise amounts of water to be added cannot be given. In the case of absorbents having a low solubility for the polyvalent metal chelate, approximately 5 percent to 10 percent water by volume, based on the total volume of the absorbent mixture, will generally provide solvency. Preferably, however, the polyvalent metal chelate or chelates are added as an aqueous solution to the liquid absorbent. Where the reactant is supplied as an aqueous solution, the amount of solution supplied may be about 20 percent to about 80 percent by volume of the total absorbent admixture supplied to the absorption zone. A polyvalent metal chelate solution will generally be supplied as an aqueous solution having a concentration of from about 0.1 molar to about 3 molar, and a concentration of about 1.0 molar is preferred. If iron is used, the ligand to iron molar ratio may range from 1.1 to 1.6, preferably 1.2 to 1.4.

Any oxidizing polyvalent metal chelate may be used, but those of iron, copper and manganese are preferred, particularly iron. The polyvalent metal of the chelate should be capable of oxidizing hydrogen sulfide, while being reduced itself from a higher to a lower valence state, and should then be oxidizable by oxygen from the lower valence state to the higher valence state in a typical redox reaction. Other polyvalent metal chelates which may be used include those of lead, mercury, palladium, platinum, tungsten, nickel, chromium, cobalt, vanadium, titanium, tantalum, zirconium, molybdenum, and tin.

Preferred reactant materials are coordination complexes in which oxidizing polyvalent metals form chelates with an acid having the formula

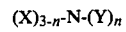

wherein n is a whole number from 1 to 3; Y is an acetic acid or propionic acid group; X is 2-hydroxy ethyl, 2-hydroxy propyl, or an alkyl group having from one to four carbon atoms; or

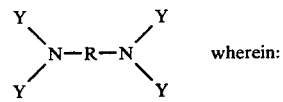

from two to four of the groups Y are selected from acetic and propionic acid groups;

from zero to two of the groups Y are selected from 2-hydroxy ethyl and 2-hydroxy propyl, and

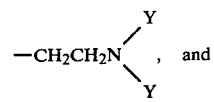

R is ethylene, propylene or isopropylene or alternatively cyclohexane or benzene where the two hydrogen atoms replaced by nitrogen are in the 1,2 position, and mixtures thereof.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA (nitrilotriacetic acid), 2-hydroxy alkyl glycine; di-hydroxyalkyl glycine, and hydroxyethyl or hydroxpropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. The iron chelates of NTA and 2-hydroxyethyl ethylene diamine triacetic acid are preferred.

The absorbents employed in this invention are those absorbents which have a high degree of selectivity in absorbing $CO_2$ (and preferably $H_2S$ as well) from the gaseous streams. Any of the known absorbents conventionally used which do not affect the activity of the polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualifications, and selection can be made by routine experimentation. For example, diethylene glycol mono ethyl-ether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxypentone-2 may be used. Suitable temperature and pressure relationships for different $CO_2$-selective absorbents are known, or can be calculated by those skilled in the art.

As indicated, the compounds designated may be used in reducing the rate of degradation of the chelates employed. More particularly, thiodiglycolic acid, 3,3-thiodipropionic acid, and mixtures thereof, may be used. The composition is supplied in a stabilizing amount, i.e., an amount sufficient to reduce or inhibit the rate of degradation. The term "stabilizing amount" thus also includes those minor amounts of the stabilizers employed, which, while perhaps not exhibiting an especially discernible reduction of ligand rate of reduction, are effective, nonetheless, in conjunction with amounts of other non-interfering and non-reactive ligand stabilizing compositions, such as those described in my copending application, entitled Stabilization Process, Ser. No. 324,359, and my copending application entitled Process for Ligand Stabilization, Ser. No. 324,360, all filed even date herewith, in reducing the ligand rate of degradation or decomposition. This amount may be determined by experimentation. In general, the amount employed will range from about 0.005 to about 0.3 mols per liter of solution, with an amount of 0.03 to about 0.2 mols per liter being preferred. Those skilled in the art may adjust the amount added to produce optimum results, a primary consideration being simply the cost of the stabilizer added.

The manner of recovering the sulfur is a matter of choice. For example, the sulfur may be recovered by settling, filtration, liquid flotation, or by suitable devices, such as a hydroclone. It is not necessary that all sulfur be removed on a continuous basis in the process; the process may suitably be operated with a minor inventory or significantly reduced content of sulfur in the system.

DETAILED DESCRIPTION OF THE INVENTION

In order to disclose the invention in greater detail, the following experiments were run. The values given herein relating to temperatures, pressures, compositions, etc., should be considered merely exemplary and not as delimiting the invention.

EXPERIMENT 1

One hundred and fifty milliliters of an aqueous solution of the $Fe^{+++}$ chelate of nitrilotriacetic acid were placed in a vessel, and a stream of pure $H_2S$ was sparged into the solution with rapid stirring. Temperature of the solution was 35° C., and the solution contained 0.27 mols per liter iron as $Fe^{+++}$. Nitrilotriacetic acid ligand was present in 40 percent mol excess, basis the iron. Sixty microliters of 1-decanol (300 PPM by weight) were also added to the solution. The pH of the solution was 7, and pressure was atmospheric. Addition of the $H_2S$ (360 cc) was continued until approximately seventy percent of the $Fe^{+++}$ was converted to the $Fe^{++}$ state, which took about 2 to 3 minutes. The flow of the $H_2S$ and the stirring action were then discontinued, oxygen in excess was sparged into the solution, and stirring resumed for 15 minutes, thus regenerating the $Fe^{+++}$, and completing one cycle. The procedure was repeated for 5 cycles, the time of regeneration varying up to 30 minutes, at which time the solution was removed from the vessel and filtered. The sulfur produced was washed, dried, and weighed. A small amount (3 ml) of solution was removed for analysis of nitrilotriacetic acid. The remainder of the solution was then returned to the vessel, and a small amount of $H_2SO_4$ was added to bring the pH back to 7. The general procedure was followed for 5 cycles, and the filtration, acid addition (if necessary), analysis, etc. was repeated. A total of 15 cycles was run, and 30 microliters of 1-decanol was added after the 6th and 12th cycles. The difference in weight between initial weight of nitrilo-triacetic acid ligand and that remaining after 15 cycles was calculated, and is a measure of loss of ligand per unit weight of sulfur produced. The result is shown in the table.

EXPERIMENT 2

A procedure similar to that of Example 1 was followed, except that the solution also contained 0.05 M thiodiglycolic acid. The result is shown in the table.

EXPERIMENT 3

A procedure similar to that of Example 1 was followed, except that the solution contained 0.05 M 3,3-thiodipropionic acid. The result is shown in the table.

TABLE

| Experiment | Stabilizer | Grams of ligand lost per gram of sulfur produced |
| --- | --- | --- |
| 1 | none | 0.14 |
| 2 | thiodiglycolic acid | 0.09 |
| 3 | 3,3-thiodipropionic acid | 0.11 |

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, an absorption column might comprise two separate columns in which the solution from the lower portion of the first column would be introduced into the upper portion of the second column, the gaseous material from the upper portion of the first column being fed into the lower portion of the second column. Parallel operation of units is, of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which may be beneficial.

What is claimed is:

1. A process for the removal of $H_2S$ from a sour gaseous stream comprising:
   (a) contacting the sour gaseous stream in a contacting zone with an aqueous reaction solution at a temperature below the melting point of sulfur, the solution containing an effective amount of a reactant selected from the group consisting of oxidizing polyvalent metal chelate compounds, and mixtures thereof, and a stabilizing amount of a composition selected from the group consisting of thiodiglycolic acid, 3,3-thiodipropionic acid, and mixtures thereof, and producing a sweet gas stream and an aqueous admixture containing crystalline sulfur and a reduced reactant;
   (b) removing at least a portion of the crystalline sulfur from the aqueous admixture;
   (c) regenerating the aqueous admixture in a regeneration zone to produce a regenerated reactant;
   (d) returning aqueous admixture containing regenerated reactant from the regeneration zone to the contacting zone.

2. The process of claim 1 wherein the stream from which the $H_2S$ is removed is selected from naturally-occurring gases, synthesis gases, process gases and fuel gas.

3. The process of claim 1 wherein the sour gaseous stream is selected from natural gas, a stream derived from the gasification of coal, or a hydrocarbon stream.

4. A process for the removal of $H_2S$ from a sour gaseous stream comprising:
   (a) contacting the sour gaseous stream in a contacting zone with an aqueous reaction solution at a temperature below the melting point of sulfur, the solution containing an effective amount of a reactant selected from the group consisting of oxidizing polyvalent metal chelate compounds, and mixtures thereof, and a stabilizing amount of a composition selected from the group consisting of thiodiglycolic acid, 3,3-thiodipropionic acid, and mixtures thereof, and producing a sweet gas stream and an aqueous admixture containing crystalline sulfur and a reduced reactant;
   (b) regenerating the aqueous admixture in a regeneration zone to produce an aqueous admixture containing a regenerated reactant;
   (c) removing at least a portion of the crystalline sulfur from aqueous admixture from step (b) to produce an aqueous admixture having reduced sulfur content;
   (d) returning aqueous admixture having reduced sulfur content to the contacting zone.

5. The process of claim 4 wherein the stream from which the $H_2S$ is removed is selected from naturally-occurring gases, synthesis gases, process gases and fuel gas.

6. The process of claim 4 wherein the sour gaseous stream is selected from natural gas, a stream derived from the gasification of coal, or a hydrocarbon stream.

7. A process for the removal of $H_2S$ and $CO_2$ from a sour gaseous stream comprising:
   (a) contacting the sour gaseous stream in a contacting zone at a temperature below the melting point of sulfur with a lean $CO_2$-selective absorbent mixture containing an effective amount of a reactant selected from the group consisting of oxidizing polyvalent metal chelate compounds, and mixtures thereof, and stabilizing amount of a composition selected from the group consisting of thiodiglycolic acid, 3,3-thiodipropionic acid, and mixtures thereof, and producing a sweet gaseous stream and an absorbent admixture containing absorbed $CO_2$, crystalline sulfur, and reduced reactant;
   (b) removing at least a portion of the crystalline sulfur from the absorbent mixture, and leaving a solution containing absorbed $CO_2$ and reduced reactant;
   (c) stripping the solution containing absorbed $CO_2$ and said reduced reactant to remove $CO_2$, and regenerating said solution, producing a lean $CO_2$-selective absorbent solution regenerated reactant; and
   (d) returning lean $CO_2$-selective absorbent solution containing regenerated reactant to the contacting zone.

8. A process for the removal of $H_2S$ and $CO_2$ from a sour gaseous stream comprising:
   (a) contacting the sour gaseous stream in a contacting zone at a temperature below the melting point of sulfur with a lean $CO_2$-selective absorbent mixture containing an effective amount of a reactant selected from the group consisting of oxidizing polyvalent metal chelate compounds, and mixtures thereof, and stabilizing amount of a composition selected from he group consisting of thiodiglycolic acid, 3,3-thiodipropionic acid, and mixtures thereof, and producing a sweet gaseous stream and an absorbent mixture containing absorbed $CO_2$, crystalline sulfur, and reduced reactant;
   (b) stripping the absorbent mixture containing absorbed $CO_2$, crystalline sulfur, and said reduced reactant, and regenerating said absorbent mixture, producing a lean $CO_2$-selective absorbent solution containing a regenerated reactant and sulfur,
   (c) removing at least a portion of the crystalline sulfur from the lean $CO_2$-selective absorbent solution containing the sulfur and the regenerated reactant, and leaving a lean $CO_2$-selective absorbent solution containing regenerated reactant, and (d) returning lean $CO_2$-selective absorbent solution containing regenerated reactant to the contacting zone.

9. The process of claim 2 wherein the oxidizing polyvalent metal chelate compound is the Fe(III) chelate of N-(2-hydroxyethyl)ethylenediamine triacetic acid.

10. The process of claim 2 wherein the oxidizing polyvalent metal chelate compound is the Fe(III) chelate of nitrilotriacetic acid.

11. The process of claim 3 wherein the oxidizing polyvalent metal chelate compound is the Fe(III) chelate of N-(2-hydroxyethyl)ethylenediamine triacetic acid.

12. The process of claim 3 wherein the oxidizing polyvalent metal chelate compound is the Fe(III) chelate of nitrilotriacetic acid.

13. The process of claim 5 wherein the oxidizing polyvalent metal chelate compound is the Fe(III) chelate of N-(2-hydroxyethyl)ethylenediamine triacetic acid.

14. The process of claim 5 wherein the oxidizing polyvalent metal chelate compound is the Fe(III) chelate of nitrilotriacetic acid.

15. The process of claim 6 wherein the oxidizing polyvalent metal chelate compound is the Fe(III) chelate of N-(2-hydroxyethyl)ethylenediamine triacetic acid.

16. The process of claim 6 wherein the oxidizing polyvalent metal chelate compound is the Fe(III) chelate of nitrilotriacetic acid.

17. The process of claim 7 wherein the oxidizing polyvalent metal chelate compound is the Fe(III) chelate of N-(2-hydroxyethyl)ethylenediamine triacetic acid.

18. The process of claim 7 wherein the oxidizing polyvalent metal chelate compound is the Fe(III) chelate of nitrilotriacetic acid.

19. The process of claim 8 wherein the oxidizing polyvalent metal chelate compound is the Fe(III) chelate of N-(2-hydroxyethyl)ethylenediamine triacetic acid.

20. The process of claim 8 wherein the oxidizing polyvalent metal chelate compound is the Fe(III) chelate of nitrilotriacetic acid.

* * * * *